July 20, 1943.　　　　　M. R. DAGUE　　　　　2,324,998
INDICATING DEPTH GAUGE
Filed Jan. 23, 1942　　　　2 Sheets-Sheet 1
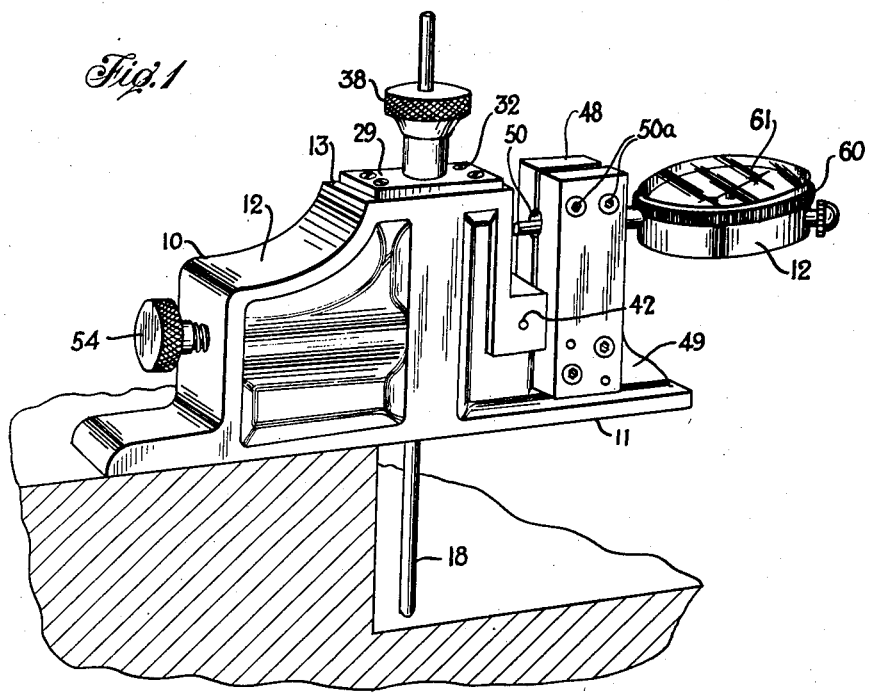
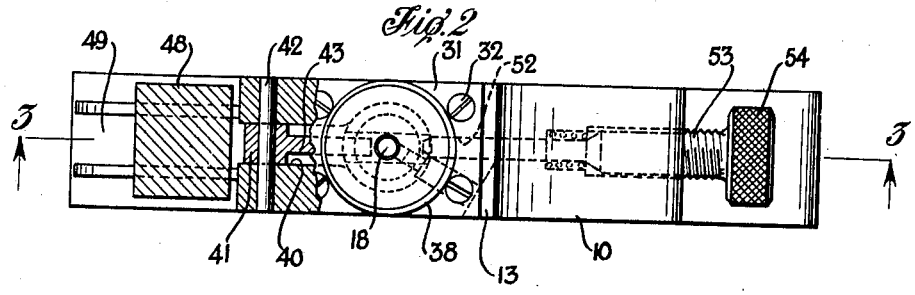
Inventor
MAX R. DAGUE
By Ely & Frye
Attorneys July 20, 1943.  M. R. DAGUE  2,324,998
INDICATING DEPTH GAUGE
Filed Jan. 23, 1942  2 Sheets-Sheet 2

Inventor
MAX R. DAGUE

Attorneys

Patented July 20, 1943

2,324,998

UNITED STATES PATENT OFFICE 2,324,998

INDICATING DEPTH GAUGE

Max R. Dague, Akron, Ohio, assignor to The Firestone Tire & Rubber Company, Akron, Ohio, a corporation of Ohio Application January 23, 1942, Serial No. 427,971

7 Claims. (Cl. 33—172)

This invention relates to gauges generally, and more specifically it relates to indicating depth gauges.

An important object of the invention resides in the provision of a depth gauge adapted to visually indicate both plus and minus variations from a predetermined depth measurement.

Another object is to provide improved means for the regulation of tension between associating gauge members and improved means for the elimination of back-lash therebetween.

A further object is to provide improved means for the translation of movement from a slidably mounted indicator rod to a visual indicating device.

Still other objects, such as the general improvement and simplification of indicating devices for one or more of the above purposes will become apparent to persons skilled in the art as the description proceeds.

In the drawings:

Fig. 1 shows in perspective an indicator having the invention incorporated therein, work being measured shown in fragmentary section.

Fig. 2 is a plan of the device of Fig. 1 with parts broken away to illustrate interior construction.

Figure 3:
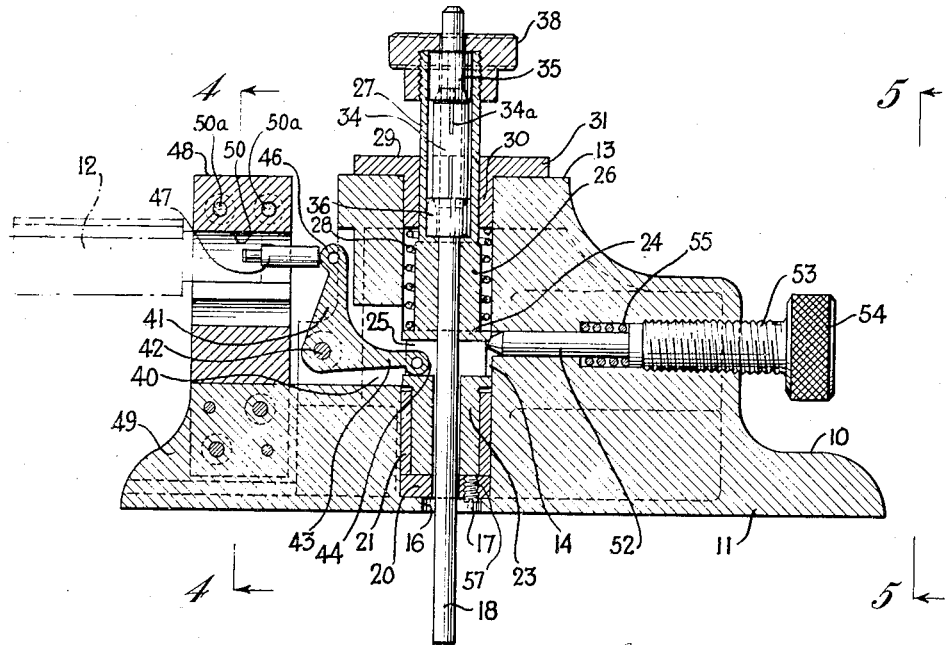
Fig. 3 is a vertical section along lines 3—3, Fig. 2.
Figure 4:
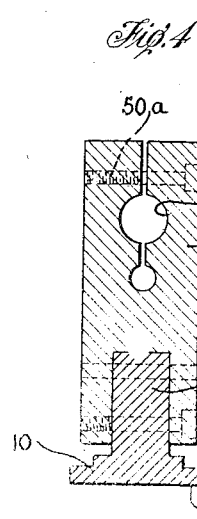
Fig. 4 is taken along lines 4—4, Fig. 3.
Figure 5:
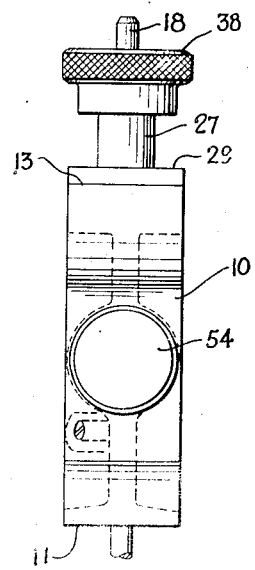
Fig. 5 is taken along lines 5—5, Fig. 3.

The device includes a main body or frame 10 which serves as a level by reason of its planate base surface 11, and provides means for the support and positioning of a dial type gauge together with associated mechanism later described. The device is illustrated in horizontal position and will be thus described, it being understood that its use is not confined to any one position. Frame 10 is provided with a vertical bore 14 extending from an upper planate surface 13, downwardly to a point near the base surface 11 but spaced thereabove. A reduced bore 16 leads from bore 14 through the base, said bore having an off-set enlargement 17 to permit access to a set screw later described. A washer 20 is positioned at the bottom of bore 14 to rest on an annular shoulder between bores 14 and 16. A sleeve 21 is snugly disposed in bore 14 with its bottom end engaging washer 20, said sleeve providing a guideway for the bottom end of a cylindrical plug 23. Plug 23 has a cylindrical portion 24 in bearing relation with the walls of bore 14, the portion being provided with a diametric slot 25 having a purpose hereinafter described. Plug 23 has a lower cylindrical end of reduced diameter in respect to portion 24, in bearing relation with sleeve 21. Above plug portion 24, extends a reduced cylindrical portion 26 and a further reduced cylindrical portion 27. Plug portion 26 is encompassed by a helical spring 28 disposed within bore 14 intermediate plug portion 24 and a guide bearing 29 that has a cylindrical portion 30 within the bore and a radially flanged portion 31 clamped to frame surface 13 by means of screws 32. Spring 28 is maintained within the bore under compression to urge plug 23 downwardly. The elongated plug 23, slidably disposed in respect to the frame 10 as above described, is centrally bored to receive the indicator rod 18 which may be adjustably clamped in respect thereto by means of a collet 34. The plug portions are provided with center bores of varying diameter but interconnected. Rod 18 is in snug fit relation to plug portion 26. Upper portion 27, is provided with a center bore of substantial size to define an elongated chamber in which is disposed a split end collet cylinder 34a, having at each end an annular clamp jaw 35, 36, the upper end of plug portion 27 being threaded to receive a collet nut 38 for clamping cylinder 34 between the annular jaws and into engagement with rod 18.

Frame 10 is suitably channeled at 40 to receive bellcrank 41, pivoted at 42 with an arm 43 provided with an arcuate terminus 44 engaging the slot wall of plug 23, and a second arm at substantially a right angle therefrom with an arcuate terminus portion 46 engaging a slidable actuating pin 47 of dial type indicator 12, clamped by means of a suitable support 48 to a reduced base portion 49 of frame 10. Support 48 is apertured at 50 to receive the meter shank and has a split portion contractible by set screws 50a for clamping engagement therewith.

An adjustment screw 52 extends through a suitable bore within the frame and is provided with a frustro-conical end portion adapted to engage with the upper wall of slot 25. Screw 52 has a shank portion 53 threadingly engaging the frame, and an adjustment knob 54 on the outer end of said threaded shank. A helical spring 55 is maintained under compression within the bore to prevent the screw from working out of adjustment during use.

Operation of the device is as follows:

Since the indicator is adapted to register plus or minus variations from a predetermined depth, the device must be so adjusted that rod 18, when clamped to plug 23, must be moved against the urge of compression spring 28 to show a zero reading on the indicator 12. While the indicator may be set from dimensions taken from one piece of work to determine the dimensions of other work in respect thereto, it is general practice to obtain a predetermined setting of rod 18 from a master shoulder gauge of any known type.

To obtain the desired setting of the device, collet nut 38 is first loosened and rod 18 is extended from base portion 11 of frame 10 the proper distance as determined by the particular shoulder gauge employed. With rod 18 in the proper position, collet nut 38 being loose, and adjustment screw 52 being disengaged from the slot wall of plug 23, the indicator is put under tension as follows. Knob 54 is rotated to bring the frustro-conical end of screw 52 into engagement with the slot wall of plug 23 to force the plug upwardly against the compression of spring 28 and turn bellcrank 41 in counterclockwise direction as shown in Figure 3 whereby to actuate the indicator 12. Knob 54 is preferably turned to register at least one full turn of the indicator of dial 12 which may be of the type registering .0001" with negative variations shown on one half of the scale and positive variations on the other half. The collet nut is then tightened to lock the rod in respect to the plug, after which knob 54 is loosened to withdraw screw 52 from engagement with the plug. The last described operation may alter the meter reading, hence dial 12 is of the type wherein the face is rotatably adjustable through an annular rim 60 after screw 52 has been withdrawn from engagement with plug 23, but before rod 18 is removed from the shoulder gauge or other setting means. Then the face of dial 12 is preferably adjusted to indicate zero reading by the arrow 61. The master shoulder gauge is then removed and when the indicator is placed on work to be measured, rod 18 must therefore be urged downwardly by spring 28 when a like measurement is taken, due to the above setting of the device, and hence both positive and negative variations from the predetermined setting, and within certain limits the work will be directly registerable on the dial.

Set screw 57 provides means for varying the extent to which plug 23 may move downwardly under the urge of spring 28. This adjustment insures obtaining the proper tension of plug 23 and pin 47 on the bell-crank arms during use of the device, the force of spring 28 being likely to decrease with use.

I claim:

1. A depth indicator having in combination, a rigid frame provided with a planate surface and a bore extending from said surface through the frame, a plug disposed within the bore in bearing relation therewith, means confining the movement of said plug to a path terminating at one end in spaced relation to the planate surface, said plug having a chambered terminus extending from the frame at a position opposite the planate surface, said chamber leading into a reduced center bore extending through the plug, an indicating rod extending through said chamber and center bore, a collet cylinder disposed within said plug chamber to encompass said rod, a pair of annular clamping jaws disposed within said chamber at opposite ends of said cylinder, a collet nut threadedly engaging the extending plug terminus for releasably clamping the indicator rod to the plug through said collet mechanism, said plug having a portion between the chambered portion and the opposite end directly engaging the walls of said bore and provided with a diametric slot having upper and lower walls in radial planes, an adjustment pin slidably disposed within the frame and having a frusto-conical end angageable with one of said radial slot walls, a compression spring urging the pin out of engagement with said wall, and a screw for forcing the pin against the urge of said spring, said frame provided with a channel leading to the slotted plug portion at a point opposite said pin, a bell crank pivotally mounted within said frame channel, said bell crank having an arm provided with an arcuate terminus extending into the plug slot and abutting the sidewall opposite the pin engaging sidewall, and a second crank arm angularly disposed respecting the first crank arm and provided with an arcuate terminus, and a visual indicator mounted on the frame and having a plunger in abutment with the arcuate terminus of said last mentioned arm.

2. In a depth indicator, the combination with a frame having a planate surface and a guideway extending through the frame and opening to said surface, of a plug like element slidably disposed within the guideway, spring means urging said element toward the planate surface, means confining movement of the element through a path terminating in spaced relation to the planate surface, an adjustment member carried by the frame to engage the plug and limit movement thereof, in opposition to said spring means, toward the planate surface, an indicator mounted on the frame at a point spaced from the plug, said indicator being operable through a plunger, and a connector element, pivoted to the frame, with an arm abutting said plunger and a second arm abutting a portion of said plug-like element, whereby sliding movement of the latter with respect to the frame is translated to the indicator.

3. In a device for visually indicating minor depth variations, both plus and minus, in a work piece, the combination with a frame having a planate surface adapted to abut the work piece adjacent a depression to be measured, an elongated member slidably disposed within an associated guideway at right angles to said planate surface, adjustment means adapted normally to constrain movement of said slide element at selective positions in spaced relation to said planate surface, means biasing said element toward the planate surface, an indicating rod extending through the slide element and frame, and means for adjustably clamping said rod to said element.

4. In a depth indicator, the combination with a rigid frame provided with a planate work-contacting surface and a guideway disposed in right angular relation thereto, of a transversely slotted plug slidably disposed in said guideway with one end projecting from the frame opposite the planate surface, an indicating rod extending axially through the plug and the guideway, a collet carried within the plug at the projecting end thereof to effect adjustable locking of the rod in engagement with the plug, a compression spring confined between the frame and plug to urge the plug toward the planate surface, a visual indicator mounted on the frame in spaced relation to the guideway, said indicator having an actuating element extending therefrom, a bell crank mounted on the frame and having a radial arm abutting the said actuating element and a second radial arm circumferentially spaced therefrom, with its outer end engaging said plug within the plug slot, and adjustment means carried by the frame for engagement with the plug, whereby to variably limit movement of said plug in respect to the frame under impetus of said spring.

5. In a depth indicator, the combination with a rigid frame provided with a planate surface, a plug element mounted to slide in respect to the frame in right angular relation to said planate surface, adjustment means for determinately varying the normal proximity of the plug with relation to the said surface, an indicating rod projecting through the plug element, means for adjustably locking the rod in respect to the plug element, an indicating meter mounted on the frame in spaced relation to the plug element, and a connector pivotally mounted on the frame for operative association with the plug element and with the meter.

6. A depth indicator comprising a rigid frame, an elongated rod in slidable relation thereto, spring means urging said rod in one direction respecting said frame, adjustment means limiting the normal position of said rod under impetus of said spring, a bell-crank pivoted to the frame and having a pair of radial arms one of which operatively associates with the rod, and an indicating device mounted on the frame in a position for operative association with the other bell crank arm, whereby slidable movement of the rod in respect to the frame is transmitted to said indicating means.

7. A depth indicator having in combination, a rigid frame provided with a planate base, and a vertical bore extending from the base through the frame, said frame being provided with a chamber disposed laterally of said bore and communicating therewith, a visual indicator mounted on the frame and having an actuating plunger extending into said chamber, a bell crank within said chamber to pivot about a base anchored pin, said bell crank having an arm engaged with said plunger and a second arm extending into said bore, an elongated plug slidably mounted in said bore for operation through a path terminating upwardly of said base, said plug being provided with a slot chamber to receive the bore disposed end of the bell crank arm, said plug being center bored to receive an elongated indicator rod extending therethrough to project below the base and into a depression to be measured, the upper end of said plug being chambered to receive rod engaging collet mechanism operative through a nut threadedly engaging the upper end of the plug and thereby to provide locking engagement between the rod and the plug, a compression spring confined within said bore to urge the plug downwardly, and a plug adjusting pin axially movable relatively of the frame and having an end portion extending into said plug slot and adjusting means at its opposite end for moving it into and out of said slot.

MAX R. DAGUE.